US 7,121,246 B2

(12) United States Patent
Uchiyama (10) Patent No.: US 7,121,246 B2
(45) Date of Patent: Oct. 17, 2006

(54) INTAKE PASSAGE OF AN INTERNAL COMBUSTION ENGINE

(75) Inventor: Shigeki Uchiyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/902,061

(22) Filed: Jul. 30, 2004

(65) Prior Publication Data

US 2005/0034702 A1    Feb. 17, 2005

(30) Foreign Application Priority Data

Aug. 11, 2003    (JP) .............................. 2003-207117

(51) Int. Cl.
*F02M 35/00* (2006.01)
*F02M 1/00* (2006.01)

(52) U.S. Cl. .............................. 123/184.42; 123/184.56

(58) Field of Classification Search ........... 123/184.42, 123/184.56, 306
See application file for complete search history.

(56) References Cited

U.S. PATENT DOCUMENTS

| 4,276,239 A | * | 6/1981 | Yoshikawa et al. | ........ 261/44.6 |
| 2003/0015160 A1 | | 1/2003 | Vichinsky | |

FOREIGN PATENT DOCUMENTS

| EP | 0 508 188 A2 | 10/1992 |
| EP | 1 424 490 A1 | 8/2004 |
| JP | 59-96426 A | 6/1984 |
| JP | 6-213087 A | 8/1994 |
| JP | 6-330827 A | 11/1994 |
| JP | 10-299590 A | 11/1994 |
| JP | 09-177624 A | 7/1997 |
| JP | 09-195869 A | 7/1997 |
| WO | WO 03/014557 A1 | 2/2003 |

* cited by examiner

*Primary Examiner*—John T. Kwon
(74) *Attorney, Agent, or Firm*—Foley & Lardner LLP (57) ABSTRACT

Branch pipes (3) of an intake manifold (1) comprise main bodies (3*c*), a common flange (11*b*) and pipe shape joining portions (11*c*) respectively connecting the main bodies (3*c*) to the flange (11*b*). By injection molding, the common flange (11*b*), the joining portions (11*c*) and a portion of the main bodies (3*c*) are formed in one piece as a first component (11), and the remaining portion of the main bodies (3*c*) is formed in one piece as a second component (12). A notch that has a metal mold draft angle (11*d*) is formed on the inner circumference of joining portion (11*c*) and the flange (11*b*). Filling the notch by using an adjusting member (22) when attaching the intake manifold (1) to an engine through the flange (11*b*) compensates for changes in shape of a passage cross section caused by the draft angle. A constant passage cross section is thus maintained.

18 Claims, 8 Drawing Sheets

INTAKE PASSAGE OF AN INTERNAL COMBUSTION ENGINE

FIELD OF THE INVENTION

This invention relates to a connecting structure between an intake manifold or an intake pipe and a cylinder head of an internal combustion engine.

BACKGROUND OF THE INVENTION

Intake manifolds of internal combustion engines have conventionally been manufactured by die-cast molding. In recent years, however, intake manifolds manufactured out of a synthetic resin by injection molding have also been proposed in order to make the intake manifolds lighter weight.

Injection molding is a process in which a resin material that has been plasticized by heating is injected within a metal mold at high pressure. The metal mold is pulled off after cooling solidification or heat curing, and a molded piece is obtained. Injection molding has an advantage in that members having a complex shape can be manufactured at a relatively low cost.

JP 9-177624 A and JP 9-195869 A, issued by the Japan Patent Office in 1997, disclose methods in which an intake manifold is divided in half into upper and lower components, and the injection molded components are unified by vibration welding.

SUMMARY OF THE INVENTION

A flange that connects to a cylinder head of an engine is provided in a distal end of the intake manifold.

It is not preferable to form a welded portion in the flange, which needs to be flat, because in vibration welding, locations that are welded expand toward the outside. The upper and lower components are therefore divided, avoiding the flange, and the flange is provided integrated with the upper component or the lower component. As a result, a pipe shape part that connects to the flange is provided to one of the components.

It is thus necessary to set a draft angle in order to pull away the metal mold from the pipe shape part when forming the pipe shape part by injection molding. That is, it is necessary for the inner diameter of the part to expand in a tapered shape in a direction toward which the metal mold is pulled off.

The cross-sectional area of the intake manifold changes in the vicinity of the cylinder head as a result. The change in the cross-sectional area, however, causes the intake air pulsation to decrease and causes the intake air resistance to increase. The change in the cross-sectional area thus becomes a factor in causing the intake air charging efficiency of a combustion chamber to decrease.

It is therefore an object of this invention to prevent changes in the cross-sectional area of a passage due to setting a draft angle.

In order to achieve the above object, this invention provides an intake passage device for an internal combustion engine. The device comprises a pipe member that is formed by using a metal mold, and an adjusting member. The pipe member has a notch provided to an inner circumference thereof at an incline with respect to an intake air flow direction to provide a draft angle to the metal mold. The adjusting member compensates for changes in the cross-sectional area of an air flow in the pipe member due to the notch.

This invention also provides a method for compensating for changes in a cross-sectional area of an air flow in a pipe member which is a component of an intake passage device of an internal combustion engine. The pipe member is formed by using a metal mold and having a notch provided to an inner circumference thereof at an incline with respect to an intake air flow direction to provide a draft angle to the metal mold.

The method comprises fitting an adjusting member into the notch. The adjusting member has a shape that compensates for changes in the cross-sectional area of an air flow in the pipe member due to the notch.

The details as well as other features and advantages of this invention are set forth in the remainder of the specification and are shown in the accompanying drawings.

DESCRIPTION OF THE PREFERRED EMBODIMENTS

Figure 1:
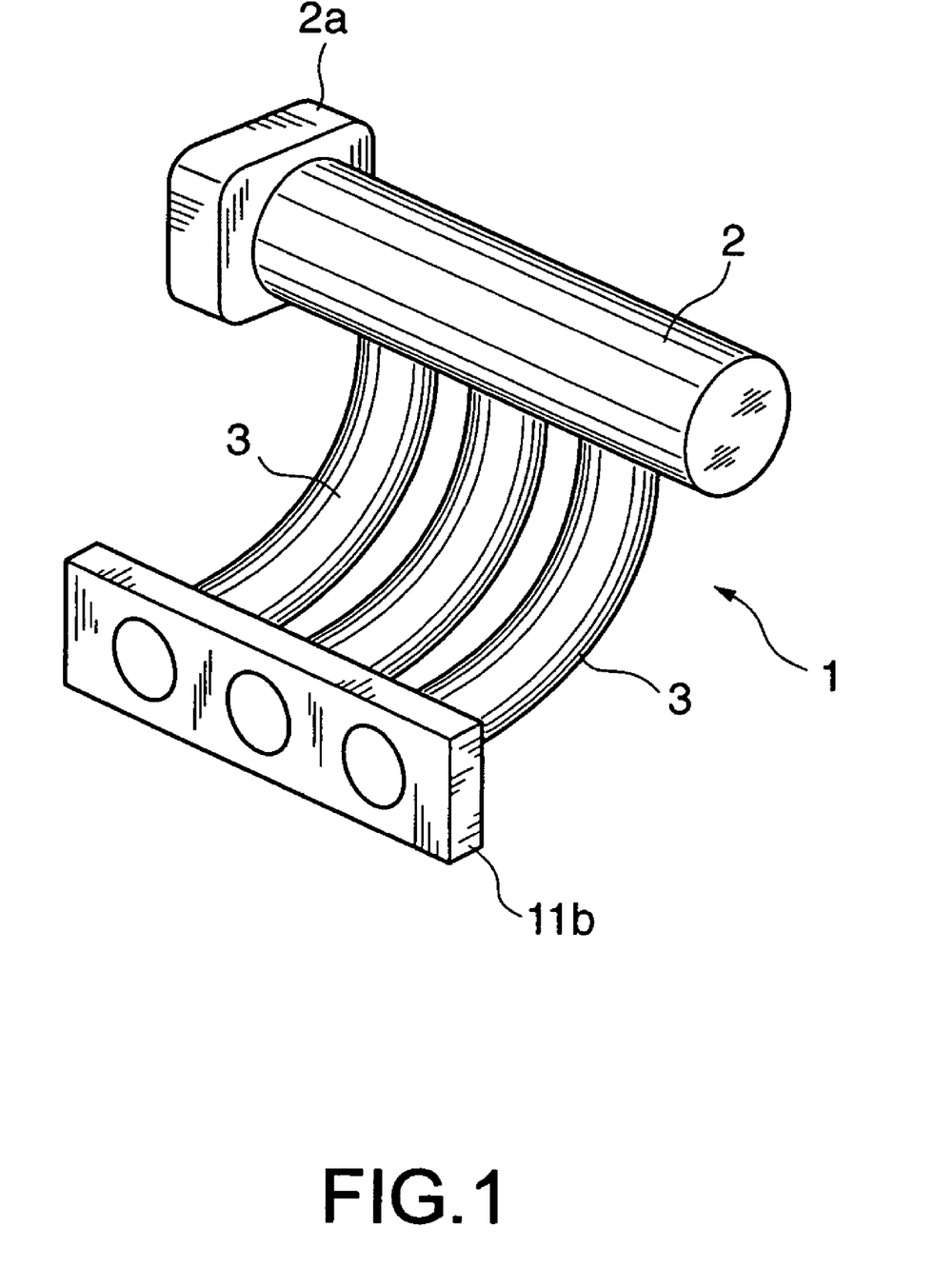
FIG. 1 is a perspective view of an intake manifold according to this invention.

Referring to FIG. 1 of the drawings, an intake manifold 1 that aspirates air into an internal combustion engine comprises a collector 2 and three branch pipes 3 that branch from the collector 2. The collector 2 is connected to a throttle that regulates the amount of aspirated air through a flange 2a.

Figure 2:
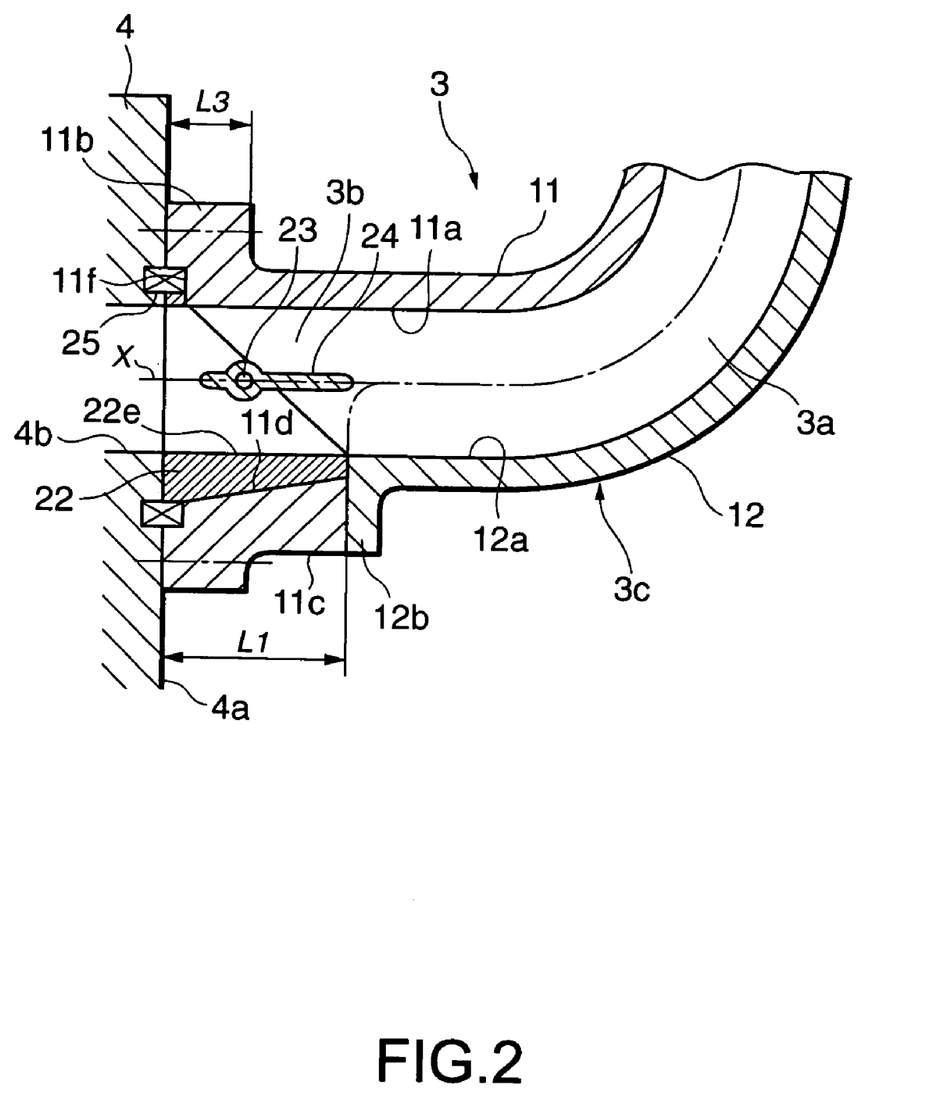
FIG. 2 is a longitudinal cross-sectional view of essential parts of the intake manifold according to this invention.

The branch pipes 3 are connected, through a common flange 11b, to the same number of intake ports 4b that are provided to a cylinder block 4 of the internal combustion engine shown in FIG. 2. During operation of the internal combustion engine, air that is regulated by the throttle is collected once in the collector 2, and then is taken in to each cylinder of the engine, through the branch pipes 3 and the intake ports 4b.

Referring to FIG. 2, the three branch pipes 3, including the flange 11b, are respectively configured by a first component 11 and a second component 12. The components are formed separately by injection molding, and unified by vibration welding.

The branch pipes 3 comprise the common flange 11b having a thickness L3, main bodies 3c, and pipe shape connecting portions 11c that connect the main bodies 3c to the flange 11b.

The first component 11 comprises the flange 11b, the three joining portions 11c, and three upper half portions 11a that have a semi-circular cross section and that correspond to upper half portions of the main bodies 3c. The second component 12 comprises three lower half portions 12a that have a semi-circular cross section and that correspond to lower half portions of the main bodies 3c, and three flange portions 12b that connect each of the lower half portions 12a to the joining portions 11c. A single dotted line in FIG. 2 shows a boundary between the first component 11 and the second component 12.

An adjusting member 22 is installed on an inner side of the flange 11b and the joining portion 11c. A cylindrical passage 3b having a length L1 is formed by the adjusting member 22.

Figure 3:
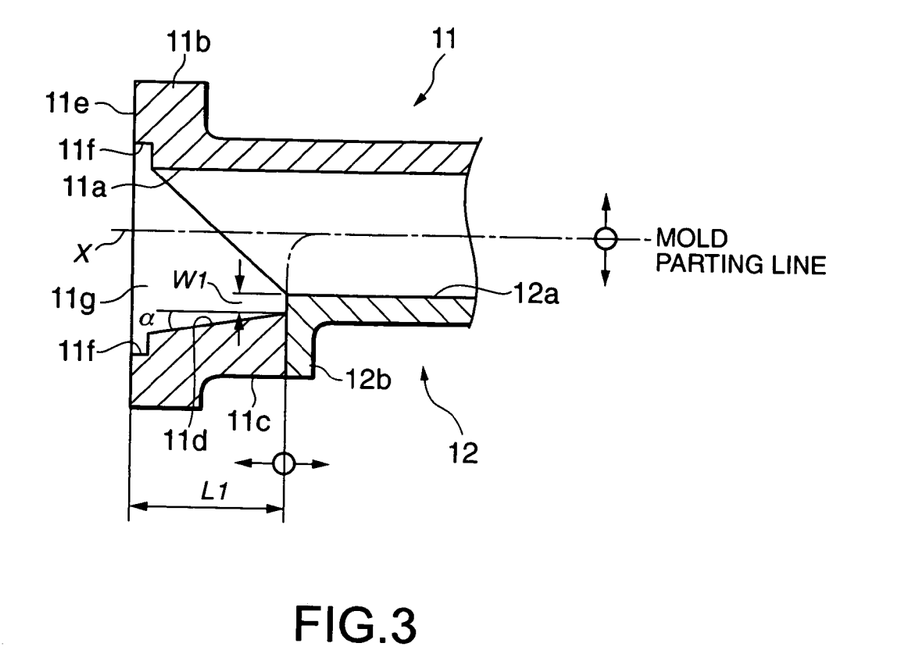
FIG. 3 is an enlarged longitudinal sectional view of essential parts of the intake manifold according to this invention.

Referring to FIG. 3, the adjusting member 22 is fitted into notches 11d and 11g that are formed on the inner side of the flange 11b and joining portion 11c. The notch 11d is formed in a lower portion of the flange 11b and the joining portion 11c. A step having a height W1 is formed between the notch 11d and an inner wall surface of the lower half portion 12a of the second component 12. Further, the notch 11d provides an inclined surface that forms an angle alpha with respect to a center axis X of the passage 3b in order to secure a metal mold draft angle when forming the first component 11 by injection molding.

The draft angle of the metal mold in injection molding is set generally to 0.5–1.0 degrees. Herein, providing that the metal mold is drafted at an angle of $\alpha/2$ with respect to the center axis X of the branch pipe 3, the angle $\alpha$ is set to a value between 1–2 degrees.

In addition, the notch 11g, which has a constant depth, is provided in the inner side of the flange 11b and the joining portion 11c, continuous with the notch 11d. The notch 11d or the notch 11g is formed in an opening portion of the flange 11b across the entire circumference of the opening portion.

A line in FIG. 2 that transversely sections the passage 3b at an incline shows a boundary of the notch 11g. A length L2 shown in FIG. 4 of an upper end of the notch 11g in the center axis X direction is set to bemuch smaller than the length L1 of the notch 11d. Excluding the notch 11d and the notch 11g, the transverse cross section of the passage 3b is circular.

The flange portion 12b of the second component 12 deflects downward at a right angle from the lower half portion 12a. The upper half portion 11a and the lower half portion 12a, and the joining portion 11c and the joining portion 12b are each fixed by vibration welding. A circular cross section passage 3a is formed in an inner side of the upper half portion 11a and the lower half portion 12a by unifying the upper half portion 11a and the lower half portion 12a. In addition, a passage 3b that has the same diameter as that of the passage 3a, that is coaxial with the passage 3a, and that is continuous with the passage 3a is formed on an inner side of the flange 11b and the joining portion 11c as shown in FIG. 2 by mating the adjusting member 22 with the notches 11d and 11g.

The passage 3b is open to a flat joining surface 11e of the flange 11b. As shown in FIG. 2, the flange 11b is fixed to a flat side surface 4a of the cylinder block 4 by using bolts. The passage 3b thus connects to the intake port 4b that is formed in the cylinder block 4. An annular groove 11f that houses a gasket 25 is formed in the joining surface 11e and the flat side surface 4a.

The adjusting member 22 comprises an inner wall surface 22e having a circular cross section that corresponds to the passage 3b. The inner wall surface 22e of the adjusting member 22 configures a portion of the passage 3b in a state where the adjusting member 22 mates the notch 11d and the notch 11g.

By providing the intake port 4b to the cylinder block 4 with the same diameter as the passage 3b, and coaxial with the center axis X, air that is taken in from the intake manifold 1 to the intake port 4b flows through a straight passage having a fixed diameter circular cross section. Accordingly, the intake port 4b is provided in an orientation that is orthogonal to the side surface 4a of the cylinder head 4.

A tumble control valve 24 is attached to the adjusting member 22 through a rotation shaft 23 that passes through the adjusting member 22 in a horizontal direction. The tumble control valve 24 is a semi-circular plate valve that rotates with the rotation shaft 23 as a fulcrum.

Figure 4:
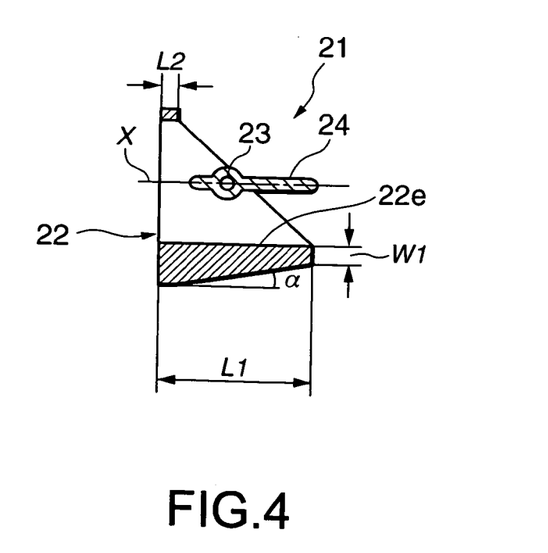
FIG. 4 is a longitudinal sectional view of an adjusting member according to this invention.

As shown in FIGS. 2 and 4, the tumble control valve 24 operates between an open position that is parallel with the center axis X of the passage 3b, and a closed position that closes the lower half portion of the passage 3b by a distal end of the tumble control valve 24 rotating downward.

The tumble control valve 24 is opened and closed by an actuator that is provided on an outer side of the passage 3b. The tumble control valve 24 is closed for cases where it is necessary to form a tumble in a combustion chamber of the internal combustion engine. Air flows through only the upper half portion of the passage 3b as a result of the tumble control valve 24 closing, and the flow velocity of the air flowing through the upper half portion of the passage 3b increases. A tumble thus forms in the combustion chamber.

As described above, the length of the upper end of the adjusting member 22 is equal to the length L2 of the upper end of the notch 11g, and the length of the lower end of the adjusting member 22 is equal to the length L1 of the notch 11d in order for the adjusting member 22 to fit into the notch 11d and the notch 11g. Making the length L1 of the lower end longer can thus increase gap management precision in the vicinity of the closed location of the tumble control valve 24.

When constructing the intake manifold 1, the first component 11 and the second component 12 are unified by vibration welding first. Next, the adjusting member 22 to which the tumble control valve 24 is attached is fitted into the notches 11d and 11g. The gasket 25 is fit to the annular groove 11f of the flange 11b, the flange 11b is joined to the side surface 4a of the cylinder head 4, and the flange 11b is fixed to the cylinder head 4 by using a plurality of bolts.

As a result of the fixing operations, the adjusting member 22 that is fitted into the notches 11d and 11g is additionally held by the joining portion 11c and the side wall 4a of the cylinder head 4. Accordingly, the adjusting member 22 is substantially fixed to a predetermined position within the intake manifold 1. It is of course also possible to bond the adjusting member 22 to the first component 11.

According to the intake manifold 1, a tapered surface 11 that has a draft angle for removing a metal mold, used for injecting molding of the first component 11, is thus covered by the adjusting member 22, and the passage 3b is connected to the intake port 4b with the flow passage cross section remaining constant. It therefore becomes possible for air to flow from the intake manifold 1 to the intake port 4b through a straight passage having a circular cross section with a fixed diameter.

As a result, the air resistance becomes smaller, and it becomes possible to utilize the intake manifold 1 in charging air into the combustion chamber without damping intake air pulsation.

Figure 10A:
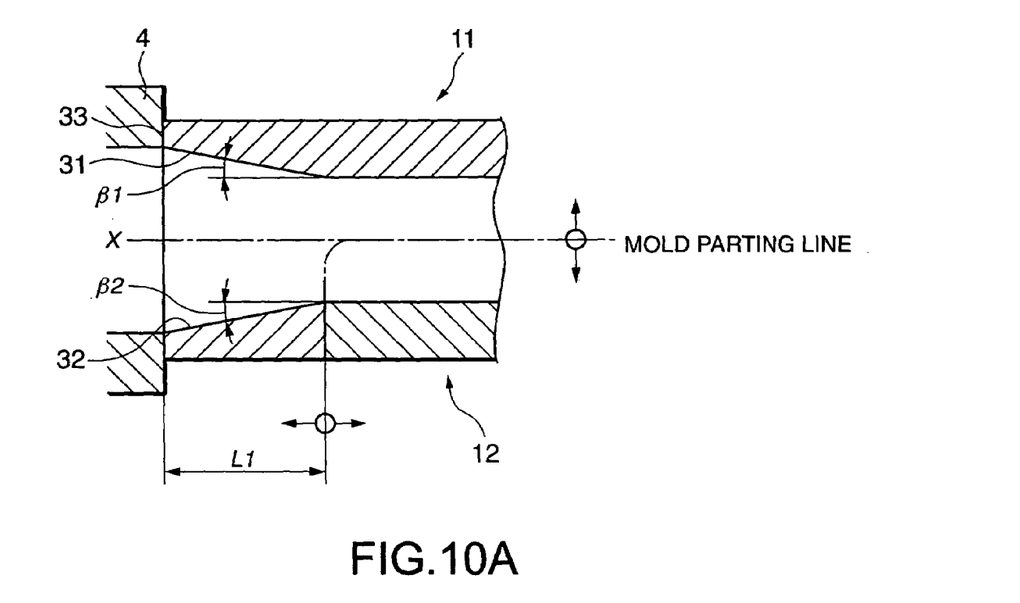
FIGS. 10A and 10B are longitudinal sectional view of essential parts of an intake manifold, showing configurations of comparative examples set up by the inventor for comparing charging efficiencies.
Figure 10B:
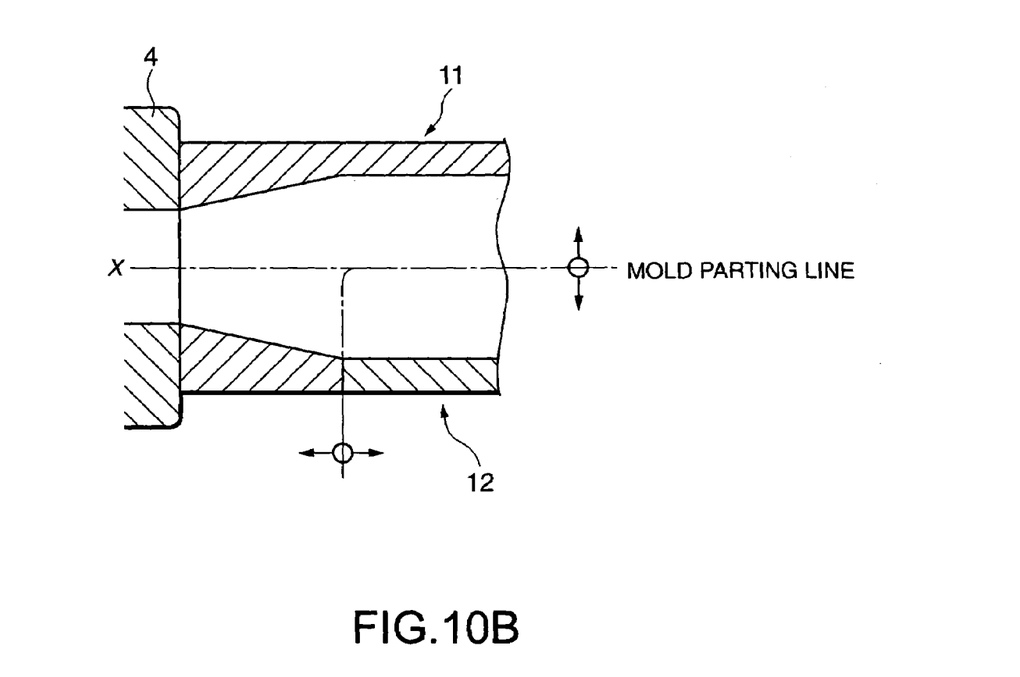

The inventor performed experiments to measure the intake air charging efficiency for the embodiment of this invention described above, and for comparative examples in which a draft angle for pulling off a metal mold during injection molding is obtained by making the passage 3b of the joining portion 11c of the first component 11 in a cone shape, as shown in FIGS. 10A and 10B. The direction toward which the metal mold is pulled off differs between FIG. 10A and FIG. 10B. That is, it is necessary to make an inner diameter of the passage 3b become larger toward an exit of the intake manifold 1, as shown in FIG. 10A, for cases where the metal mold is pulled off toward the exit. It is necessary to make the inner diameter of the passage 3b become smaller toward the exit, as shown in FIG. 10B, for cases where the metal mold is pulled off toward an entrance of the intake manifold 1. Draft angles $\beta 1$ and $\beta 2$ are set so that $\beta 1+\beta 2=\alpha$.

Figure 5:
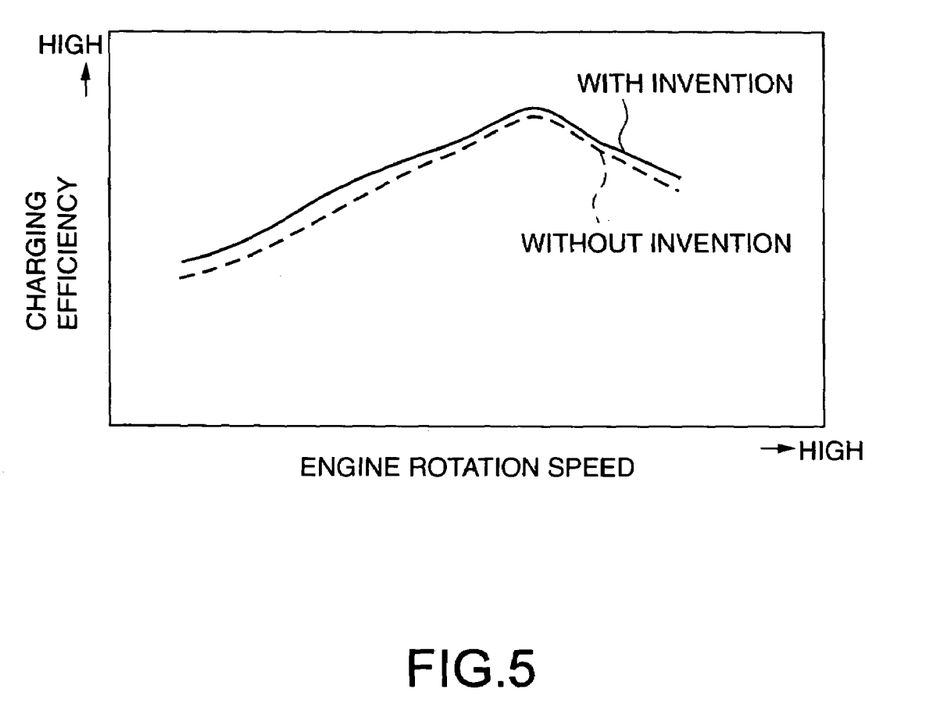
FIG. 5 is a diagram that explains intake air charging efficiency obtained by the intake manifold according to the present invention.

The results of the experiments show that a higher intake air charging efficiency is obtained by the embodiment of this invention shown by a solid line in FIG. 5 for all rotation regions of the internal combustion engine compared to the comparative examples shown by a broken line.

Next, referring to FIGS. 6 and 7, injection molding of the first component 11 and the second component 12 will be explained.

Figure 6:
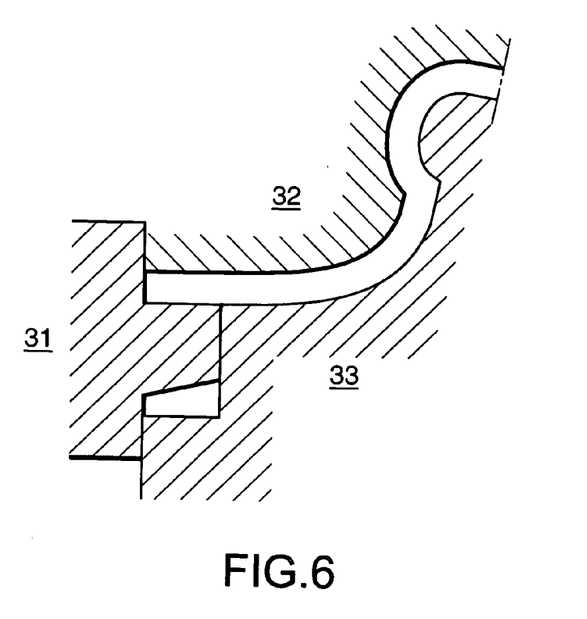
FIG. 6 is a longitudinal sectional view of a three piece metal mold for injection molding a first component according to this invention.

Referring to FIG. 6, a three piece metal mold, with metal mold pieces 31, 32, and 33, is used in an injection molding for the first component 11. An inner circumferential surface of the length L1 joining portion 11c of the first component 11 is formed by the first metal mold 31, and a majority of an outer circumferential surface of the first component 11 is formed by the second metal mold 32. An inner circumferential surface of the first component 11 outside of the joining portion 11c, and a portion of an outer circumferential surface of the joining portion 11c are formed by the third metal mold 33.

It is necessary to pull away the first metal mold 31 in a direction toward the left in FIG. 6 after injection molding using a synthetic resin, but a tapered surface for a draft angle is not formed over the entire inner circumference of the joining portion 11c in this embodiment. The angle $\alpha$ of the tapered surface is instead set to equal the sum of the upper and lower draft angles $\beta 1$ and $\beta 2$ of FIGS. 10A and 10B, respectively, as described above.

The first metal mold 31 is pulled off after injection molding of the first component 11 in a direction that is prescribed by an angle $\alpha/2$, that is, in a direction that is slightly downward from the horizontal direction. The draft angle of the metal mold 31 thus becomes substantially the same as that of the comparative examples. Accordingly, there is no influence on the durability of the metal mold 31. Further, there are no cost increases due to the addition of a slide mold.

Figure 7:
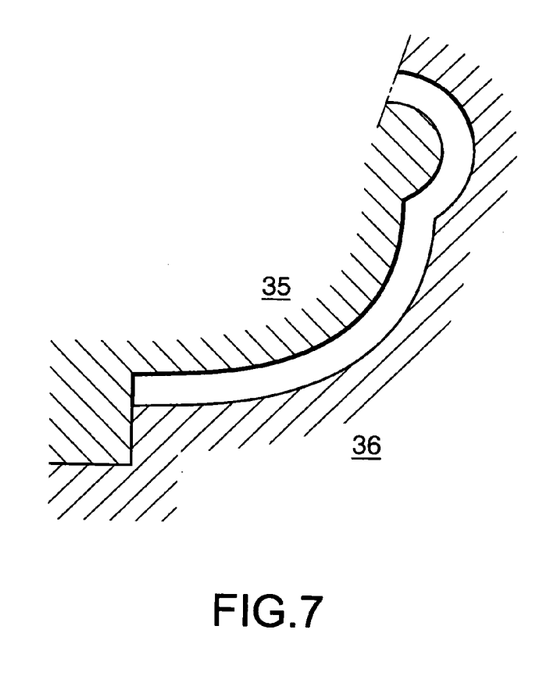
FIG. 7 is a longitudinal sectional view of a two piece metal mold for injection molding a second component according to this invention.

The second component 12 is injection molded by using a normal two piece metal mold, with metal mold pieces 35 and 36, as shown in FIG. 7.

Figure 8:
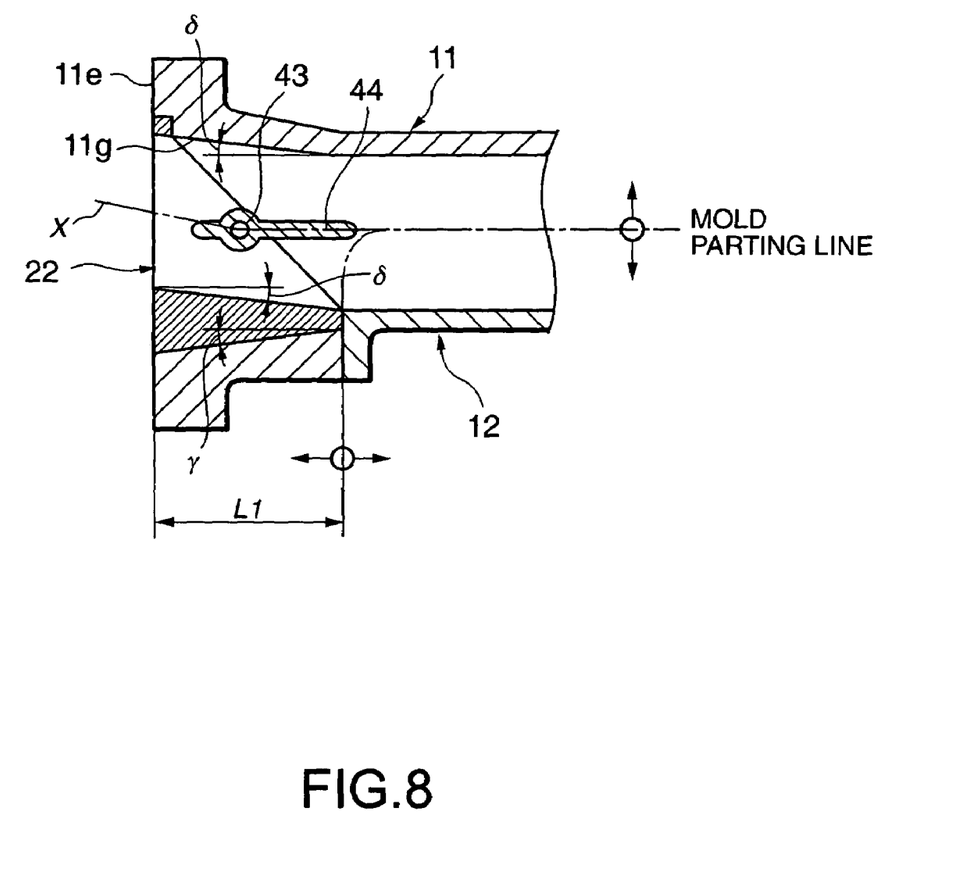
FIG. 8 is a longitudinal sectional view of essential parts of an intake manifold according to a second embodiment of this invention.

Referring to FIG. 8, a second embodiment of this invention will be explained.

A draft angle is set over an entire inner circumferential surface of the joining portion 11c of the first component 11 in this embodiment. Specifically, a metal mold is formed so that there is a draft angle $\delta$ in an upper end of the inner wall surface of the joining portion 11c, and there is a draft angle $\gamma$ in a lower end of the inner wall surface of the joining portion 11c.

On the other hand, a lower end of an inner wall surface of the adjusting member 22 is inclined at an angle $\delta$, which is the same angle as the draft angle of the upper end of the inner wall surface of the joining portion 11c, so that an upward slope is formed in an exit direction.

The flange portion 11b of the intake manifold 1 and the passage 3b within the joining portion 11c become slightly deflected with respect to the upstream passage 3a by this setting. However, the intake passage cross sections are identical. Accordingly, a favorable intake air charging efficiency can be obtained in this embodiment.

The internal combustion engine is assumed to have three cylinders, and the intake manifold 1 is provided with the three branch pipes 3 in the embodiments described above.

This invention is, however, not dependent upon the number of branch pipes, and this invention can be applied to intake pipes of internal combustion engines having any number of cylinders, including a single cylinder.

Further, although the plurality of branch pipes 3 of the intake manifold 1 are connected to the cylinder head 4 through the common flange 11b in the embodiments described above, it is also possible to apply this invention to intake manifolds provided with a flange for each of the branch pipes 3.

Figure 9:
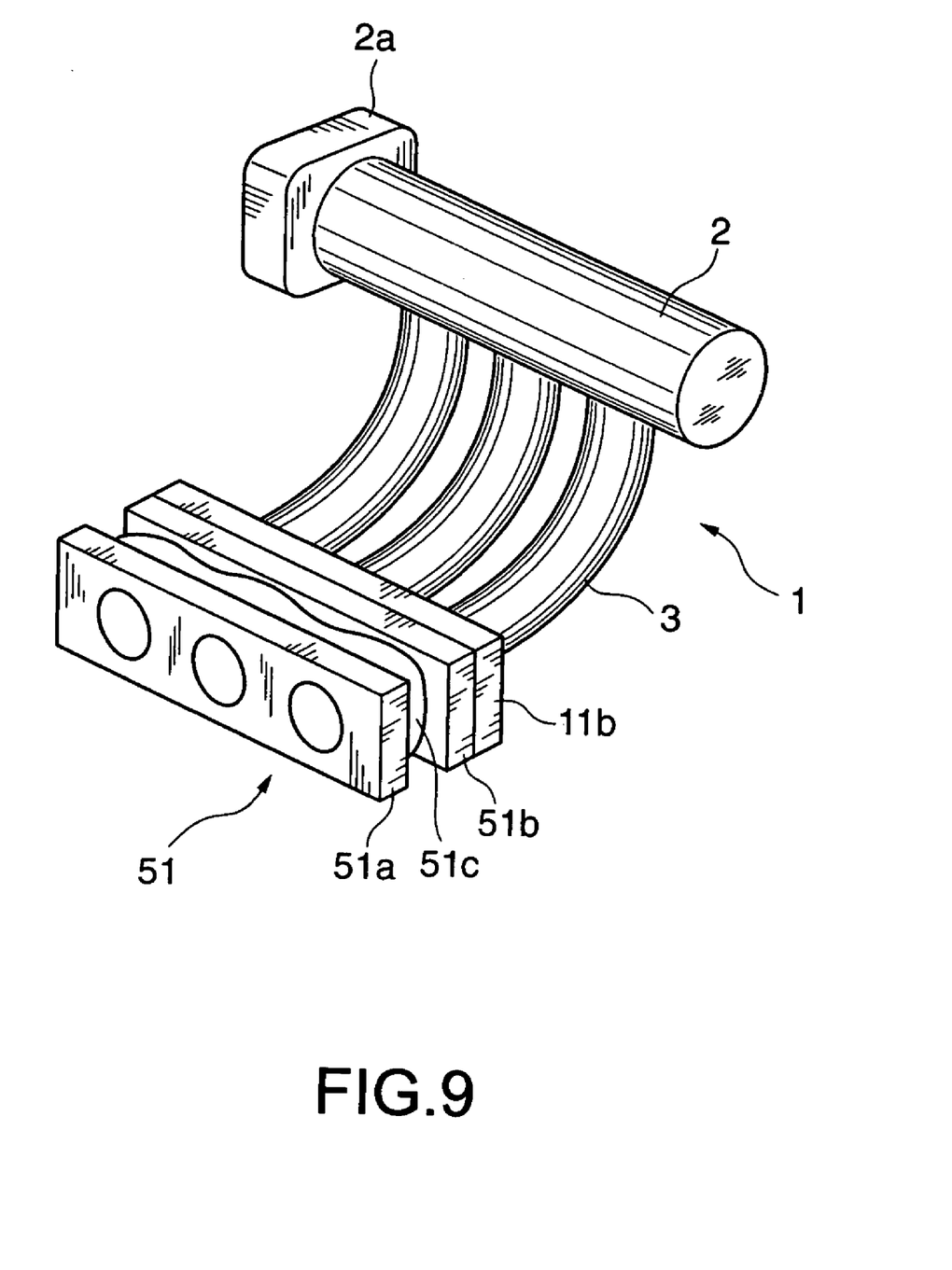
FIG. 9 is a perspective view of an intake manifold according to a third embodiment of this invention.

Next, referring to FIG. 9, a third embodiment of this invention, in which this invention is applied to an adapter 51 for extending an intake passage, will be explained.

The adapter 51 comprises a flange 51b that is fixed to the flange 11b of the intake manifold 1, a flange 51a that is fixed to a cylinder block, and a conduit 51c that reaches from the flange 51b to the flange 51a.

In this case the flange 51a, the flange 51b, and an upper half portion of the conduit 51c are formed integrally as a first component, and integrated with a separately formed lower half portion of the conduit 51c as a second component by vibration welding. A notch that is provided with a draft angle is formed in a wall surface of the first component and second component. The cross-sectional area of the intake passage can be made constant by mounting an adjusting member in the notch when the adapter 51 is fixed to the intake manifold and the cylinder head. It therefore becomes possible in this case to apply this invention to both the intake manifold 1 and to the adapter 51.

The contents of Tokugan 2003-207117, with a filing date of Aug. 11, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, although the tumble control valve 24 is provided to the adjusting member 22 in the embodiments described above, this invention is also effective for cases in which a swirl control valve is provided as a substitute for the tumble control valve 24, and for cases in which no valve at all is provided to the adjusting member.

Although the components 11 and 12, which are manufactured by injection molding of a synthetic resin, are taken as objects by the embodiments described above, it is also possible to apply this invention to components manufactured by aluminum die casting.

The embodiments of this invention in which an exclusive property or privilege is claimed are defined as follows.

What is claimed is:

1. An intake passage device for an internal combustion engine, the device comprising:
    a pipe member that is formed by using a metal mold, the pipe member including a notch provided to an inner circumference thereof at an incline with respect to an intake air flow direction to provide a draft angle to the metal mold;
    an adjusting member that is shaped to fit into the notch compensates for changes in the cross-sectional area of an air flow in the pipe member due to the notch; and
    a tumble control valve that is supported by the adjusting member, the tumble control valve being pivoted on a rotation shaft that is orthogonal to a center axis of the pipe member, and including a distal end that rotates in a direction away from the center axis.

2. The intake passage device as defined in claim 1, wherein the notch is formed in only a portion of the inner circumference of the pipe member.

3. The intake passage device as defined in claim 1, wherein the internal combustion engine includes an intake port that is connected to the pipe member, and the pipe member includes a center axis that coincides with a center axis of the intake port.

4. The intake passage device as defined in claim 1, wherein the notch is formed at a position on the inner circumference that faces the distal end of the tumble control valve when the distal end is rotated in the direction away from the center axis, and a length of a part of the adjusting member that fits into the notch is set longer than a length of the other part of the adjusting member in the direction along the center axis.

5. The intake passage device as defined in claim 1, wherein the internal combustion engine includes a multiple cylinder engine that includes an intake manifold, and the pipe member includes an adapter that connects the intake manifold to the internal combustion engine.

6. The intake passage device as defined in claim 1, wherein the adjusting member is set to have a length such that the distal end of the tumble control valve rotated in a direction away from the center axis stays within the length of the adjusting member.

7. An intake passage device for an internal combustion engine, the device comprising:
    a pipe member that is formed by using a metal mold, the pipe member including a notch provided to an inner circumference thereof at an incline with respect to an intake air flow direction to provide a draft angle to the metal mold;
    an adjusting member that compensates for changes in the cross-sectional area of an air flow in the pipe member due to the notch; and a tumble control valve supported by the adjusting member;
    wherein the pipe member includes a flange, a joining portion that is continuous with the flange, and a main body that is continuous with the joining portion, and the notch is formed continuously on inner surfaces of the joining portion and the flange.

8. An intake passage device for an internal combustion engine, the device comprising:
    a pipe member that is formed by using a metal mold, the pipe member including a notch provided to an inner circumference thereof at an incline with respect to an intake air flow direction to provide a draft angle to the metal mold; and
    an adjusting member that compensates for changes in the cross-sectional area of an air flow in the pipe member due to the notch;
    wherein the pipe member comprises a first component that comprises a flange, a joining portion that is continuous with the flange, and an upper half portion of a main body that is continuous with the joining portion, and a second component that is fixed to the first component and that comprises a lower half portion corresponding to a remaining portion of the main body.

9. The intake passage device as defined in claim 8, wherein the first component and the second component are formed of an injection molded synthetic resin.

10. The intake passage device as defined in claim 9, wherein the second component is fixed to the first component by vibration welding.

11. The intake passage device as defined in claim 8, wherein the draft angle is set over an entire length of the joining portion of the first component.

12. The intake passage device as defined in claim 8, wherein the notch is formed such that the draft angle is set over an entire length of the joining portion of the first component, and that a step corresponding to a thickness of the adjusting member is formed between the joining portion and the second component.

13. The intake passage device as defined in claim 7, wherein the internal combustion engine includes a multiple cylinder engine, the device includes an intake manifold, and the pipe member includes branch pipes for the intake manifold.

14. The intake passage device as defined in claim 13, wherein flanges of each of the branch pipes are formed integrally as an integrated flange.

15. The intake passage device as defined in claim 14, wherein the first component includes the integrated flange, the joining portions of the branch pipes, and the upper half portions of the main bodies of the branch pipes, and the second component includes a remaining part of the main bodies of the branch pipes.

16. The intake passage device as defined in claim 7, wherein the adjusting member is formed in a shape that fits into the notch, and the adjusting member, when fitted into the notch, forms an intake passage inside thereof that is coaxial with an intake passage formed inside the main body.

17. The intake passage device as defined in claim 7, wherein the adjusting member is formed in a shape that fits into the notch, and the adjusting member, when fitted into the notch, forms an intake passage inside thereof that is deflected with respect to an intake passage formed inside the main body.

18. The intake passage device as defined in claim 7, wherein the internal combustion engine includes a multiple cylinder engine that includes an intake manifold, and the pipe member includes an adapter that connects the intake manifold to the internal combustion engine.

* * * * *